(12) United States Patent  (10) Patent No.: US 7,459,885 B2
Miyamoto  (45) Date of Patent: *Dec. 2, 2008

(54) APPARATUS FOR MONITORING THE VOLTAGE OF A BATTERY PACK HAVING A PLURALITY OF BATTERY CELLS CONNECTED IN SERIES

(75) Inventor: Manabu Miyamoto, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 8 days.

This patent is subject to a terminal disclaimer.

(21) Appl. No.: 11/705,506

(22) Filed: Feb. 13, 2007

(65) Prior Publication Data

US 2007/0188149 A1 Aug. 16, 2007

(30) Foreign Application Priority Data

Feb. 15, 2006 (JP) ............................. 2006-038446

(51) Int. Cl.
*H01M 10/46* (2006.01)
(52) U.S. Cl. ..................................................... 320/134
(58) Field of Classification Search ................. 320/106, 320/110, 116, 118, 119
See application file for complete search history.

(56) References Cited

U.S. PATENT DOCUMENTS

2007/0114973 A1* 5/2007 Miyamoto ................... 320/132

FOREIGN PATENT DOCUMENTS

| JP | 2003-111284 | 4/2003 |
|---|---|---|
| JP | 2003-208927 | 7/2003 |
| JP | 2005-117780 | 4/2005 |

* cited by examiner

*Primary Examiner*—Edward Tso
(74) *Attorney, Agent, or Firm*—Young & Thompson

(57) ABSTRACT

A battery voltage monitoring apparatus to monitor a voltage of an assembled battery having a plurality of battery cells, the battery voltage monitoring apparatus comprises a first voltage sensor module having a voltage sensor and a first and a second module terminals connected to the voltage sensor, a second voltage sensor module having a voltage sensor different from the voltage sensor included in the first voltage sensor module and a third module terminal connected to the voltage sensor, a first terminal connected to the first and the third module terminals, a second terminal connected to the second module terminal, and a voltage clamp circuit to clamp a voltage between the first and the second terminals disposed between the first and the second terminals.

13 Claims, 14 Drawing Sheets

| | IC1 | | IC2 | |
|---|---|---|---|---|
| | V4-VSS1 VOLTAGE | VCC1-VSS1 VOLTAGE | V5-V6 VOLTAGE | VCC2-VSS2 VOLTAGE |
| WITH ZENER | 7.72V | 15.22V | -1.22V | 10.78V |
| WITHOUT ZENER | 5.0V | 12.5V | 1.5V | 13.5V |

| | IC1 | | IC2 | |
|---|---|---|---|---|
| | V4-VSS1 VOLTAGE | VCC1-VSS1 VOLTAGE | V5-V6 VOLTAGE | VCC2-VSS2 VOLTAGE |
| WITH ZENER | -1.22V | 10.78V | 7.72V | 15.22V |
| WITHOUT ZENER | 1.5V | 13.5V | 5.0V | 12.5V |

APPARATUS FOR MONITORING THE VOLTAGE OF A BATTERY PACK HAVING A PLURALITY OF BATTERY CELLS CONNECTED IN SERIES

INCORPORATION BY REFERENCE

The disclosure of U.S. application Ser. No. 11/387,926 filed on Mar. 24, 2006 including the specification, drawings and abstract is incorporated herein by reference in its entirety.

BACKGROUND OF THE INVENTION

1. Field of the Invention

The present invention relates to a battery voltage monitoring apparatus for detecting a battery voltage of a power supply apparatus composed of a plurality of secondary batteries connected in series, and particularly to a battery voltage monitoring apparatus for detecting a disconnection of a signal line when the line is disconnected while measuring a voltage.

2. Description of the Related Art

An electric car and a hybrid car are known as an environmental friendly vehicle. In the electric and hybrid cars, a motor is used as a driving source to drive vehicles. An electrifiable secondary battery is connected to the motor. A direct-current voltage obtained from the secondary battery is converted into an alternating voltage to drive the motor. As the secondary battery requires high voltage, the secondary battery is usually formed as an assembled battery having a plurality of battery cells connected in series.

A plurality of voltage sensors are used to detect a voltage of each battery cell in the assembled battery. The voltage sensors are modularized by appropriate number. If the number of battery cells connected in series is large as in the electric car, a plurality of the modules of the voltage sensors are prepared to be connected in series. An apparatus for monitoring voltages of such assembled battery is disclosed in Japanese Unexamined Patent Application Publication No. 2003-208927, No. 2003-111284, and No. 2005-117780. An apparatus to monitor voltages of the assembled batteries is described hereinafter in detail. For, example, the monitoring apparatus has a plurality of semiconductor apparatuses (modules of the voltage sensors, which are ICs) that are connected in series. Each semiconductor apparatus (IC) have the plurality of battery sensors.

FIG. 13 is a schematic view showing a conventional voltage monitoring apparatus 100. As shown in FIG. 13, one IC is able to detect voltages of four battery cells. Each input terminal is connected to battery cells C11 to C18 via lines for voltage measurement L11 to L19. The IC11 of FIG. 13 operates with a positive electrode (node N11) of the battery cell C11 as a power supply potential, and a negative electrode (positive electrode of the battery cell C15, which is node N12) of the battery cell C14 as a ground potential. IC12 is connected in series with IC11. IC12 operates with a positive electrode (node N12) of the battery cell C15 as the power supply potential, and a negative electrode of the battery cell C18 (node N13) as a ground potential. Each of the ICs detects an overvoltage or a low-voltage condition of the battery cells to monitor, and output an overvoltage or a low-voltage detection signal. In such apparatus having a plurality of ICs or the like connected in series to monitor voltages of assembled batteries, there is a following problem if a line such as the line L15 is disconnected, where the line is a connecting line between ICs.

If the line L15 of FIG. 13 is disconnected, the voltage is not supplied to the node N14 from the battery cell. Thus the voltage of the node N14 increases or decreases. With the increased voltage of node N14, potential differences (voltage) increase between the terminals of IC12, which are V15 and V16, and between the power supply and the ground. With the decreased voltage of the node N14, potential differences (voltage) increase between the terminals of IC11, which are V14 and VSS, and between the power supply and the ground.

It has now been discovered that as a result of the increased potential difference between terminals of ICs or between the power supply and ground due to the disconnection of the line, the potential difference exceeds the voltage between terminals and the power supply voltage, thus possibly destroying the ICs as the modules for voltage sensor.

SUMMARY OF THE INVENTION

According to an aspect of the present invention, there is provided a battery voltage monitoring apparatus for monitoring a voltage of an assembled battery having a plurality of battery cells. The battery voltage monitoring apparatus includes a voltage sensor and a first voltage sensor module having a first and a second module terminals connected to the voltage sensor, a second voltage sensor module having a voltage sensor different from the voltage sensor included in the first voltage sensor module and a third module terminal connected to the voltage sensor, a first terminal connected to the first and the third module terminals, a second terminal connected to the second module terminal, and a voltage clamp circuit for clamping a voltage between the first and the second terminals disposed between the first and the second terminals.

By clamping the voltage between terminals, it is possible to prevent the voltage between the terminals to be more than a constant value.

The present invention applies a voltage more than a rated value between terminals and enables to prevent from destroying voltage sensor modules.

BRIEF DESCRIPTION OF THE DRAWINGS

The above and other objects, advantages and features of the present invention will be more apparent from the following description taken in conjunction with the accompanying drawings, in which.

PREFERRED EMBODIMENT OF THE INVENTION

The invention will be now described herein with reference to illustrative embodiments. Those skilled in the art will recognize that many alternative embodiments can be accomplished using the teachings of the present invention and that the invention is not limited to the embodiments illustrated for explanatory purposed.

First Embodiment

Figure 1:
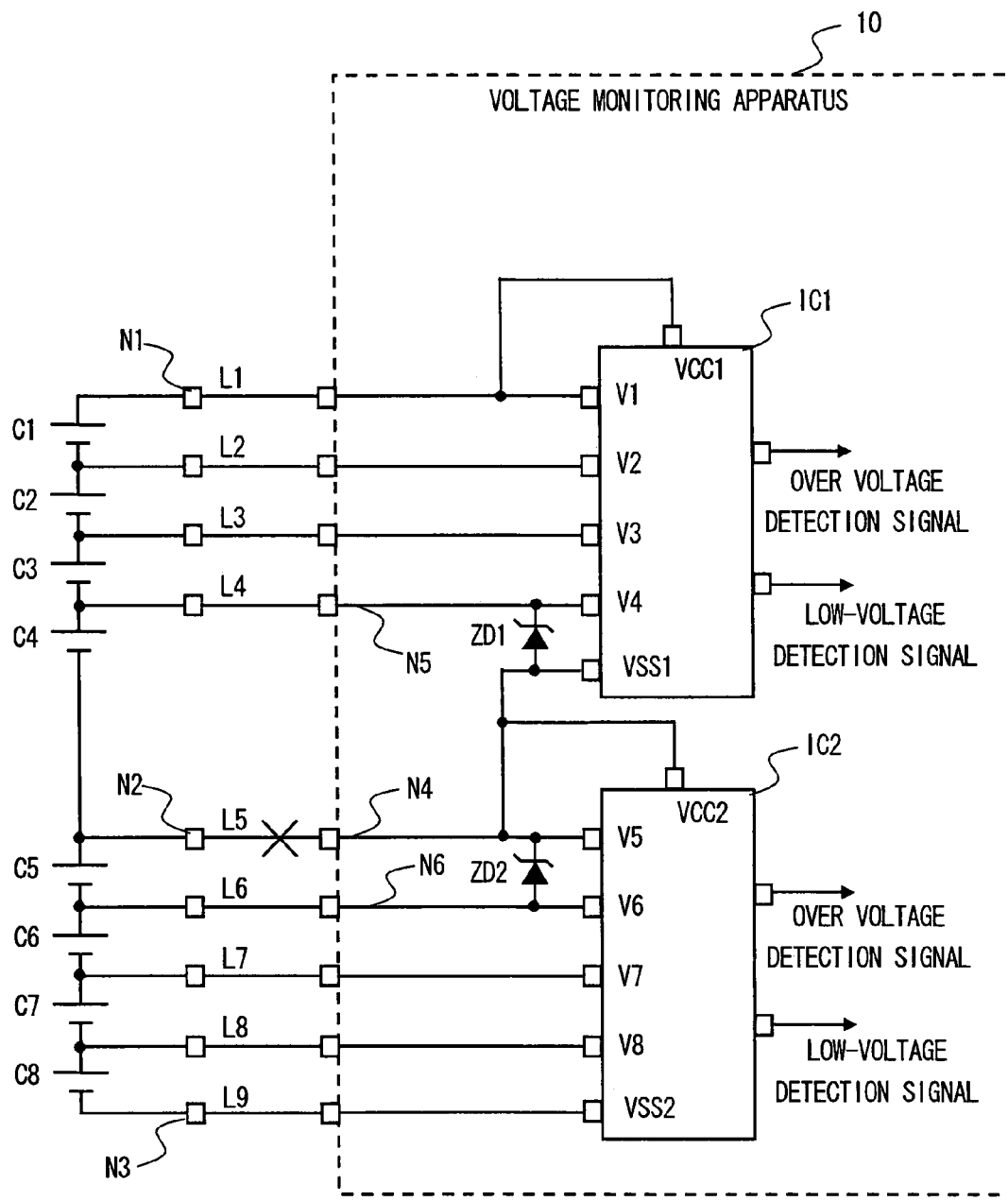
FIG. 1 is a view showing a voltage monitoring apparatus according to a first embodiment of the present invention.

FIG. 1 is a schematic view showing a voltage monitoring apparatus 10 according to a first embodiment of the present invention. The voltage monitoring apparatus 10 of this embodiment includes a plurality of voltage sensor modules. The voltage sensor module is a device modularized of one or a plurality of voltage sensors. In this embodiment, one module is constituted by one semiconductor apparatus (IC). FIG. 1 is a view showing a case in which a voltage monitoring apparatus 10 includes two voltage sensor modules (hereinafter referred to as IC) IC1 and IC2. A first embodiment is described hereinafter in detail with an example of a case where one IC detects voltages of four battery cells.

As shown in FIG. 1, eight battery cells C1 to C8 monitored by the voltage monitoring apparatus 10 are connected in series. IC1 operates with a potential of a positive electrode of the battery cell C1 (see node N1 of FIG. 1) as a first power supply potential (upper power supply potential), and a potential of a positive electrode of the battery cell C5 (see node N2 of FIG. 1) as a second power supply potential (ground potential). As IC2 is connected in series with IC1, IC2 operates with the potential of the positive electrode of the battery cell C5 (node N2) as the first power supply potential, and a potential of a negative electrode of the battery cell C8 (see node N3 of FIG. 1) as the second power supply potential (ground potential).

Positive electrodes of each battery cell are connected to input terminals V1 to V8 of IC via lines L1 to L8. As shown in FIG. 1, the input terminals V1 to V4 are input terminals of IC1. The input terminals V5 to V8 are input terminals of IC2. As described in the foregoing, since IC takes the potential of the positive electrode of the battery cell C1 as the first power supply potential, the positive electrode of the battery cell C1 is also connected to a first power supply terminal VCC1 of IC1 via the line L1. Specifically, the line L1 is also a power supply line to the voltage sensor module IC1. The potential of the positive electrode of the battery cell C5 is the second power supply potential of IC1 and the first power supply potential of IC2. Thus the positive electrode of the battery cell C5 is connected to the second power supply terminal VSS1 of IC1, the first power supply terminal VCC2 of IC2, and the input terminal V5 of IC2 via the line L5. Specifically the line L5 is also a power supply line to IC1 and IC2. The negative electrode of the battery cell C8 is connected to a second power supply terminal VSS2 of IC2 via a power supply line L9.

In the first embodiment, a Zener diode ZD1, which is a voltage clamp circuit, is connected between the input terminal V4 of IC1 and the power supply terminal VSS1. A Zener diode ZD2, which is a voltage clamp circuit, is connected between the input terminals V5 and V6 of IC2. An anode of the diode ZD1 is connected to the VSS1 terminal, and a cathode is connected to the V4 terminal. An anode of the diode ZD2 is connected to the V6 terminal, and a cathode is connected to the V5 terminal. Specifically, a voltage clamp circuit is connected between a terminal (N5) supplied with a voltage higher than the terminal (N4) by one battery cell stage and the terminal (N4), where the terminal.(N4) being a connection point of ICs. Further, a voltage clamp circuit is connected between a terminal (N6) supplied with a voltage lower than the terminal (N4) by one battery cell stage and the terminal (N4), where the terminal (N4) being the connection point of ICs. The battery cell here does not mean a single battery cell. If a plurality of the battery cells are connected between adjacent terminals (for example between V5 and V6) of a voltage sensor module, the plurality of battery cells are referred to as the battery cell. The battery cell here is a target that one voltage sensor monitors for a voltage.

The voltage monitoring apparatus 10 configured as described herein measures voltages output from each battery cell (C1 to C8) of the voltage sensor modules (IC1 and IC2). The voltage sensor modules monitor the voltages of the battery cells by outputting the overvoltage detection signal when the voltage of the battery cell becomes overvoltage or the low-voltage detection signal when the voltage of the battery cell becomes low-voltage. Details of the operation are described later in detail.

A case is described hereinafter, where the line L5, a connection point between IC1 and IC2, is disconnected for some reason in the voltage monitoring apparatus 10 configured as above. When the line L5 is disconnected, the potential of the positive electrode of the battery cell C5 (potential of the node N2) is not supplied. Thus the potential of the node N4 of FIG. 1 becomes unstable, resulting in a decrease or an increase. With the decrease in the potential of the node N4, a voltage applied between the input terminal V4 and the second power supply terminal VSS1 of IC1 increases. In this embodiment, as the Zener diode ZD1 is connected between the input terminal V4 and the power supply terminal VSS1, the voltage between V4 and VSS1 is clamped by a breakdown voltage of ZD1.

With the increase in the potential of the node N4, a voltage applied between the input terminals V5 and V6 of IC2 increases. In this embodiment, as the Zener diode ZD2 is connected between the input terminals V5 and V6, the voltage between V5 and V6 is clamped by a breakdown voltage of ZD2.

According to the present embodiment, by connecting the Zener diode, which is a voltage clamp device, between the terminals (VSS1 and V5) connected to the line (L5) to be power supplies of the voltage sensor modules (IC1 and IC2) and other terminals, a voltage more than a rated value is applied between terminals, preventing from destroying ICs.

Figure 2A:
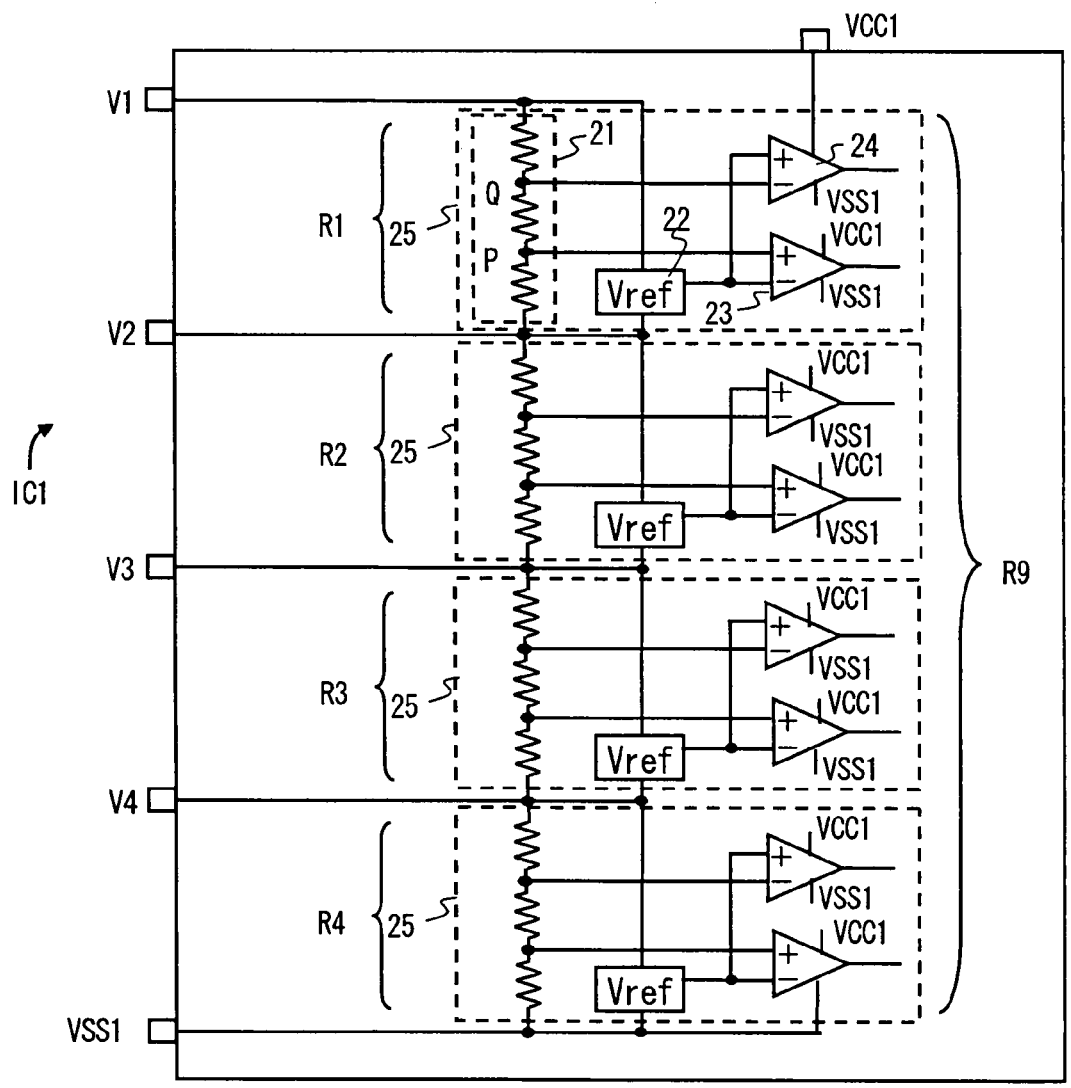
FIG. 2A is a circuit diagram showing a voltage sensor module according to the first embodiment of the present invention.

The operation and advantageous effect described above are described hereinafter in detail with specific numeric values. A configuration of the IC (voltage sensor module) in the voltage monitoring apparatus of the first embodiment is described hereinafter in detail. FIG. 2A is a view showing a configuration of one IC (for example IC1).

Figure 2B:
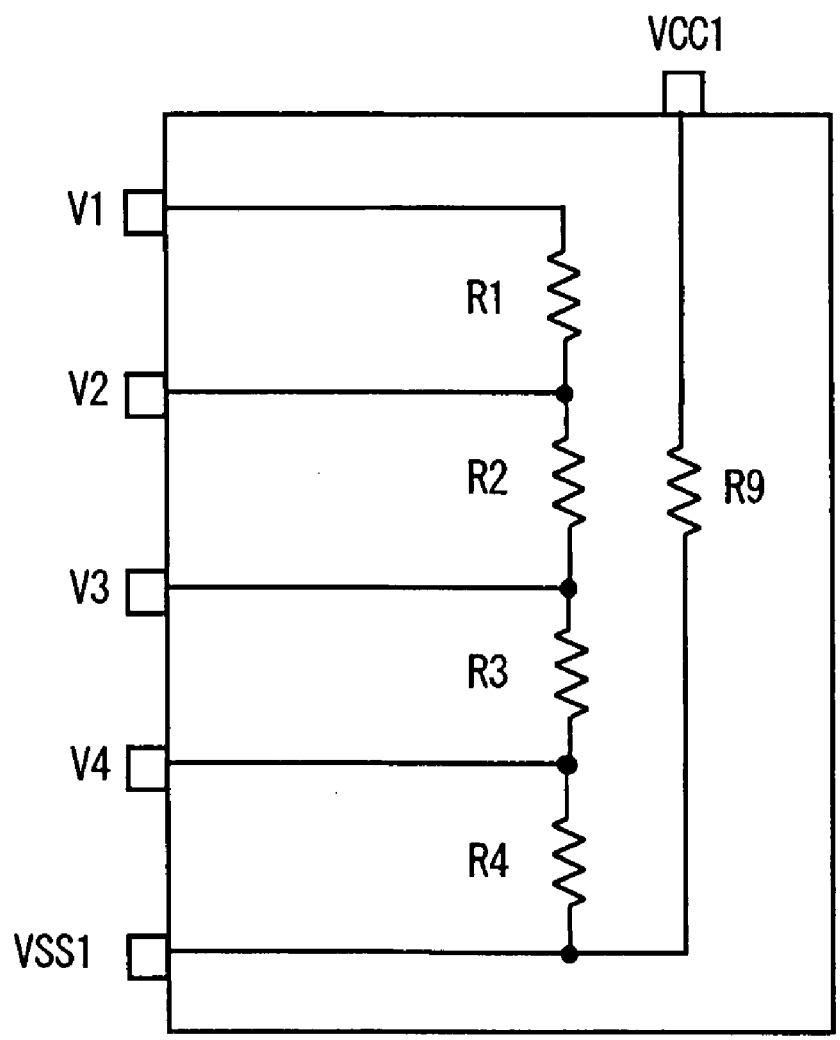
FIG. 2B is a view showing an impedance of the voltage sensor module according to the first embodiment of the present invention.

As shown in FIG. 2A, voltage sensors 25 are connected between each of the terminals in the voltage sensor module of this embodiment. A configuration of the voltage sensor 25 is described hereinafter in detail with reference to an example of the voltage sensor between the input terminals V1 and V2 in FIGS. 2A and 2B. As shown in FIG. 2, the voltage sensor of the first embodiment includes a dividing resistance 21, a reference voltage (Vref) generator 22, an overvoltage detection comparator 23, and a low-voltage detection comparator 24. A first dividing point P of the dividing resistance is connected to a noninverted input terminal of the overvoltage detection comparator 23. A second dividing point Q of the dividing resistance is connected to an inverted input terminal of the low-voltage detection comparator 24. The voltage Vref output from the reference voltage generator 22 is connected to the inverted input terminal of the overvoltage detection comparator 23 and to the noninverted input terminal of the low-voltage detection comparator 24.

In the voltage sensor, a voltage of the dividing point P of the dividing resistance is compared with the reference voltage Vref by the overvoltage detection comparator 23. If the voltage of the dividing point P of the dividing resistance for voltage detection is higher than the reference voltage Vref, the overvoltage detection comparator 23 outputs an overvoltage detection signal (for example H level signal). Similarly, a voltage of the dividing point Q of a resistance for voltage detection is compared with the reference voltage by the low-voltage detection comparator 24. If the voltage of the dividing point Q is lower than the reference voltage, a low-voltage detection signal (for example H level signal) is output.

The reference voltage generation circuit 22 operates with a voltage (for example a voltage between V1 and V2) output from one battery cell as the power supply voltage. The overvoltage detection comparator 23 and the low-voltage detection comparator 24 operate with the voltage (for example a voltage between VCC1 and VSS1) as the power supply voltage. As shown in FIG. 2A, a synthetic impedance of a circuit using the potential difference between the input terminals V1 and V2 as in FIG. 2A as the power supply voltage is referred to as R1. A synthetic impedance of a circuit using the potential difference between the input terminals V2 and V3 as the power supply voltage is referred to as R2. A synthetic impedance of a circuit using the potential difference between the input terminals V3 and V4 as the power supply voltage is referred to as R3. A synthetic impedance of a circuit using the potential difference between the input terminals V4 and VSS1 as the power supply voltage is referred to as R4. A synthetic impedance of a circuit using the potential difference between the input terminals VCC1 and VSS1 as the power supply voltage is referred to as R9. With these impedances, the impedances of the circuit shown in FIG. 2A can be represented by the equivalent circuit of FIG. 2B.

Figure 3:
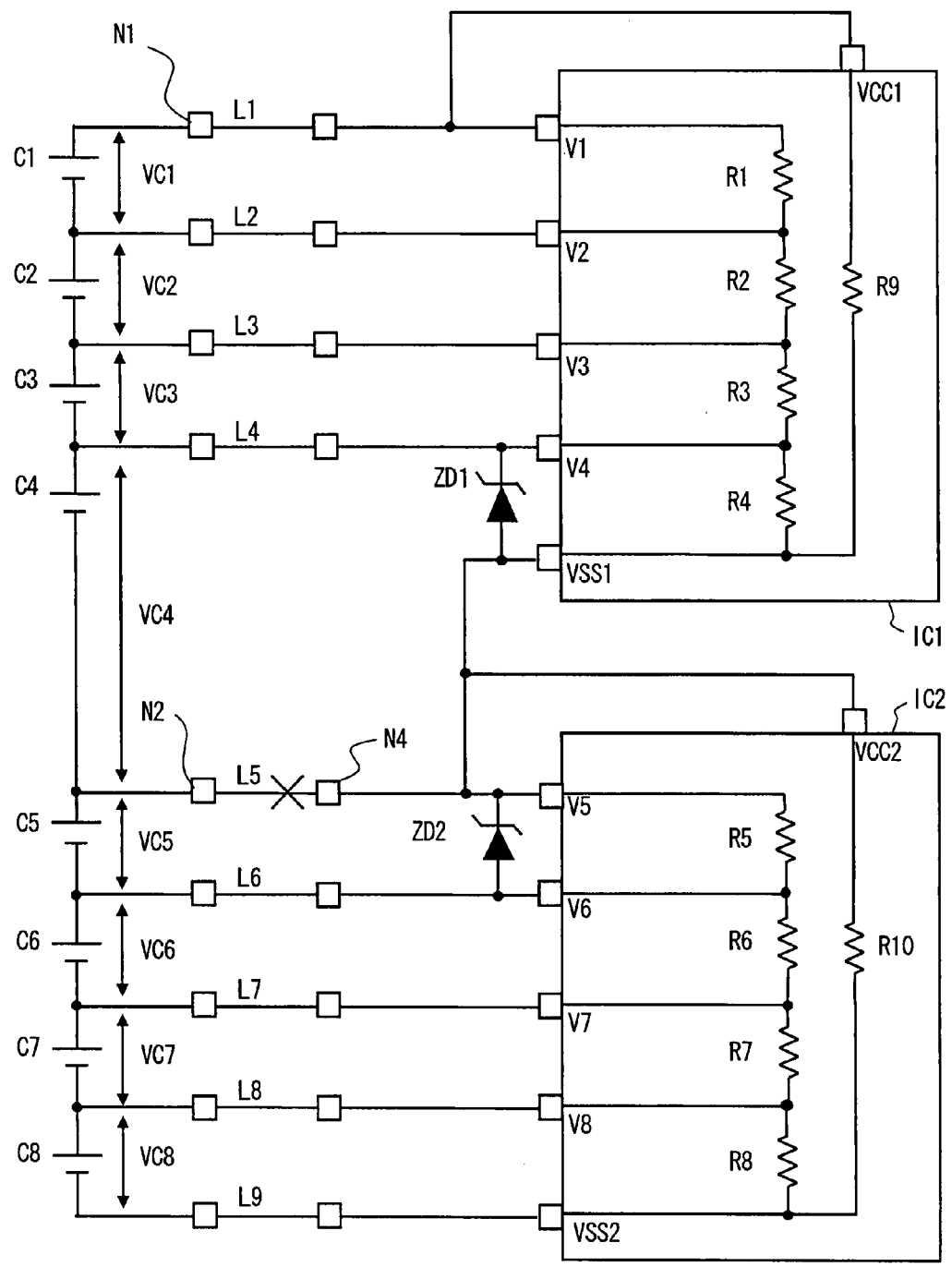
FIG. 3 is an equivalent circuit diagram showing the voltage monitoring apparatus according to the first embodiment of the present invention.

Considering a similar equivalent circuit as for IC2 of FIG. 1, the impedance of FIG. 1 may be considered by the circuit of FIG. 3. In a conventional voltage monitoring apparatus, the diodes ZD1 and ZD2 are not provided as in FIG. 3. Thus a similar equivalent circuit as in FIG. 3 for a conventional circuit is considered, with the voltages output from the battery cells C1 to C8 assuming to be VC1 to VC8 and the line L5 is disconnected. If the line L5 is disconnected in the conventional voltage monitoring apparatus, the voltage $V_{5-6}$ between the input terminals V5 and V6 (voltage of V5 viewed from V6) can be calculated by the following formula.

$$V_{5-6} = \frac{\frac{VC4+VC5}{R4} + \frac{VC1+VC2+VC3+VC4+VC5}{R9} + \frac{VC6+VC7+VC8}{R10}}{\frac{1}{R4} + \frac{1}{R5} + \frac{1}{R10} + \frac{1}{R9}}$$

As in the above formula, without the Zener diodes ZD1 and ZD2 of this embodiment, the voltage between V5 and V6 widely varies due to a fluctuation in the impedances R9 and R10 of the voltage sensor modules IC1 and IC2 and a fluctuation of the battery cell outputs.

Figures 4A, 4B:
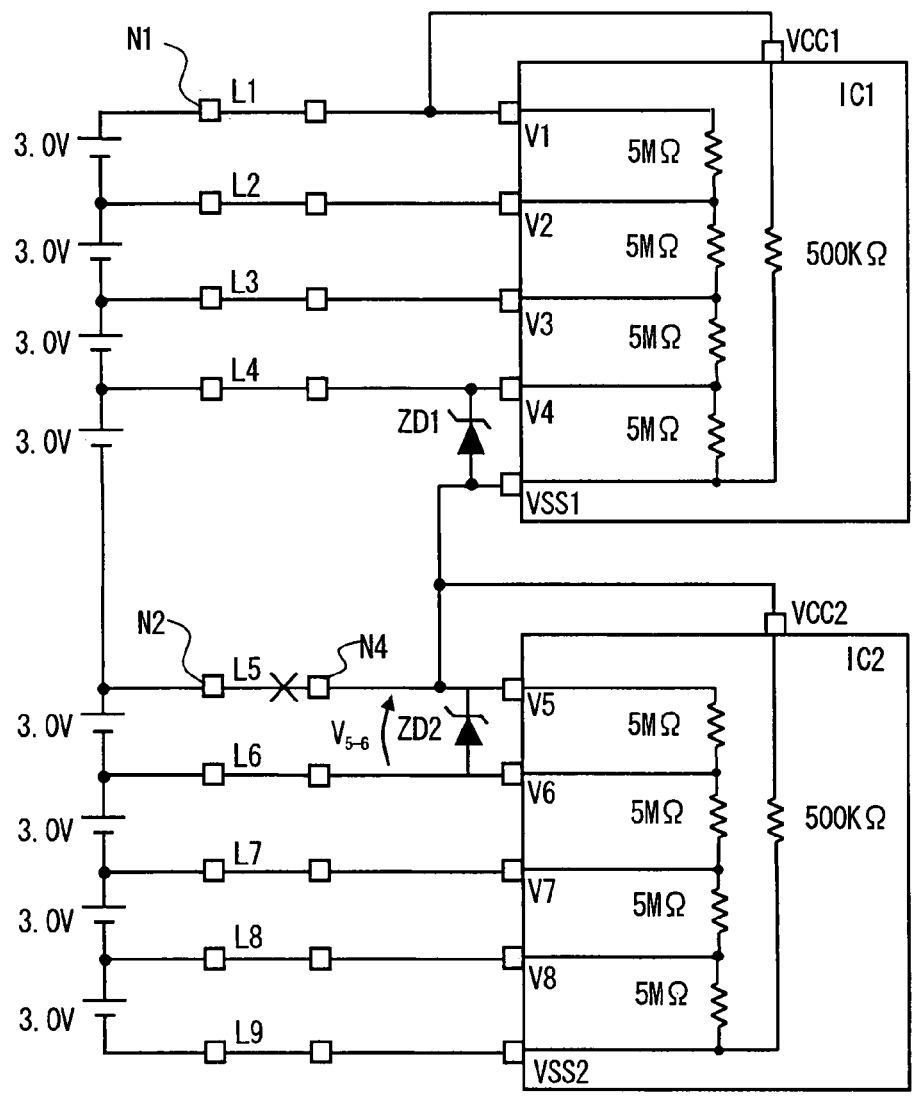
FIG. 4A is a view showing a specific example of the voltage monitoring apparatus according to the first embodiment of the present invention.
FIG. 4B is a view showing a voltage relationship of the circuit shown in FIG. 4A.

A case where a characteristic fluctuation is generated while manufacturing the voltage sensor modules is considered hereinafter as in FIGS. 4A to 6A. FIGS. 4A to 6B are specific examples of the fluctuations where an output voltage of one battery cell is 3.0V, an impedance of a circuit operating with a voltage between terminals as a power supply is 5 MΩ, and an impedance of a circuit operating a power supply of IC as a power supply voltage is 500KΩ. The voltage monitoring apparatus of FIG. 4A is an example having no fluctuation in the voltage sensor modules. In such case, if the line L5 is disconnected in a conventional circuit, the voltage of the voltage $V_{5-6}$ between the input terminals V5 and V6 in the above formula does not change but remains to be 3V. Accordingly the voltage between the input terminal V4 of IC1 and the power supply terminal VSS1 does not change, remaining to be 3V. Even in a circuit having the Zener diodes of this embodiment, the voltage between the terminals does not change (see FIG. 4B).

Figures 5A, 5B:
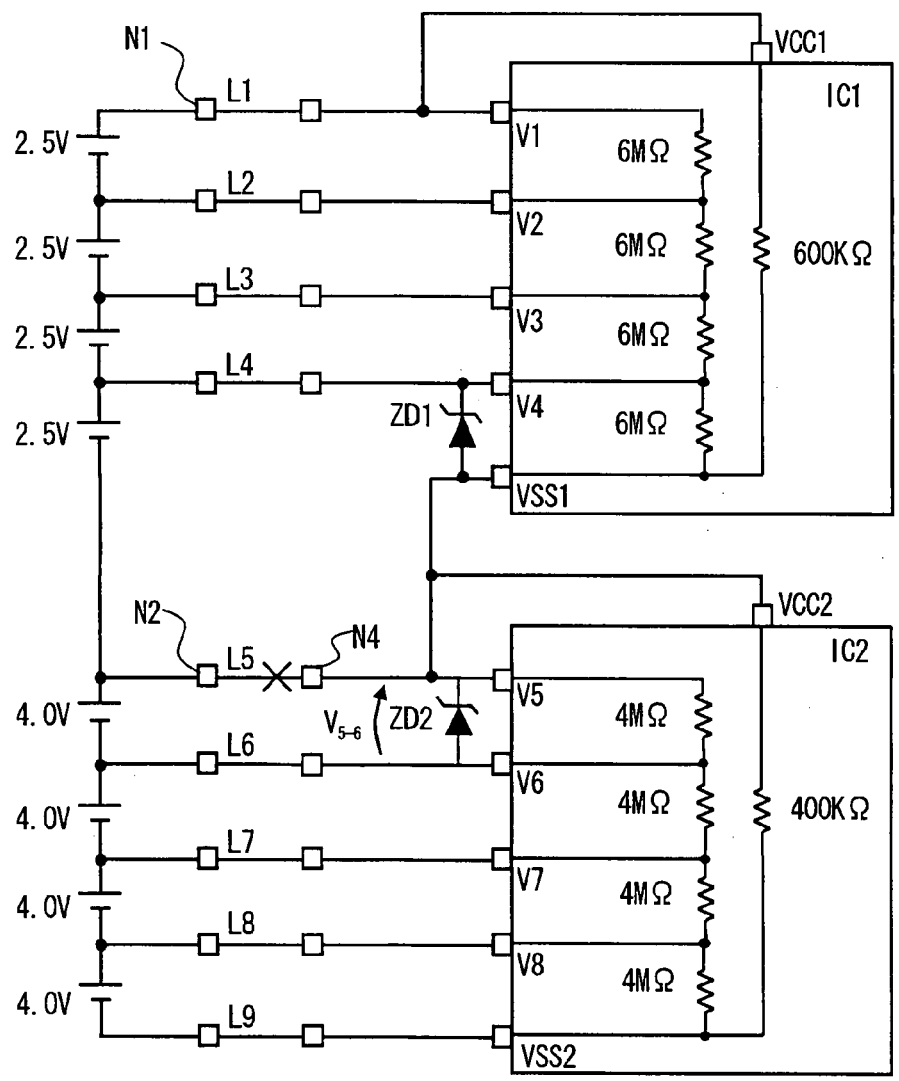
FIG. 5A is a view showing a specific example of the voltage monitoring apparatus according to the first embodiment of the present invention.
FIG. 5B is a view showing a voltage relationship of the circuit shown in FIG. 5A.

On the other hand, a configuration is considered hereinafter with R1=R2=R3=R4=6 MΩ and R9=600KΩ in IC1, and with R5=R6=R6=R7=R8=4 MΩ and R10=400KΩ in IC2 as shown in FIG. 5A due to fluctuation in production tolerance or the like. The fluctuation is generated in the outputs from the battery cells, outputting voltages of VC1=VC2=VC3=VC4=2.5V and VC5=VC6=VC7=VC8=4.0V. In such case, if the line L5 is disconnected, the potential of the node N4 decreases. Calculating using the above formulas results the voltage between the input terminals V5 and V6 to be −1.22V, in the conventional circuit. Further, the voltage of the input terminal V4 viewed from the second power supply terminal VSS1 in IC1 becomes 7.72V. Accordingly in a conventional circuit, a voltage more than the rated value is applied between the input terminal V4 and the second power supply terminal VSS1 of IC1, and between the input terminals V5 and V6 of IC2, thereby possibly destroying IC1 and IC2. On the other hand in the voltage monitoring apparatus of this embodiment, the Zener diodes are disposed between the input terminals V5 and V6 of IC2, and between the input terminal V4 and the second power supply terminal VSS1 of IC2. Thus even if the potential of the node N4 decreases to be more than the breakdown voltage of the Zener diode ZD1, the voltage between V4 and VSS1 is clamped by the breakdown voltage. In case the rated voltage between the terminals is 6V, by connecting Zener diode of 5V between V4 and VSS1 by the breakdown voltage, the voltage between V4 and VSS1 can be clamped up to 5V, and the voltage between V5 and V6 can be clamped up to 1.5V (see FIG. 5B).

Figures 6A, 6B:
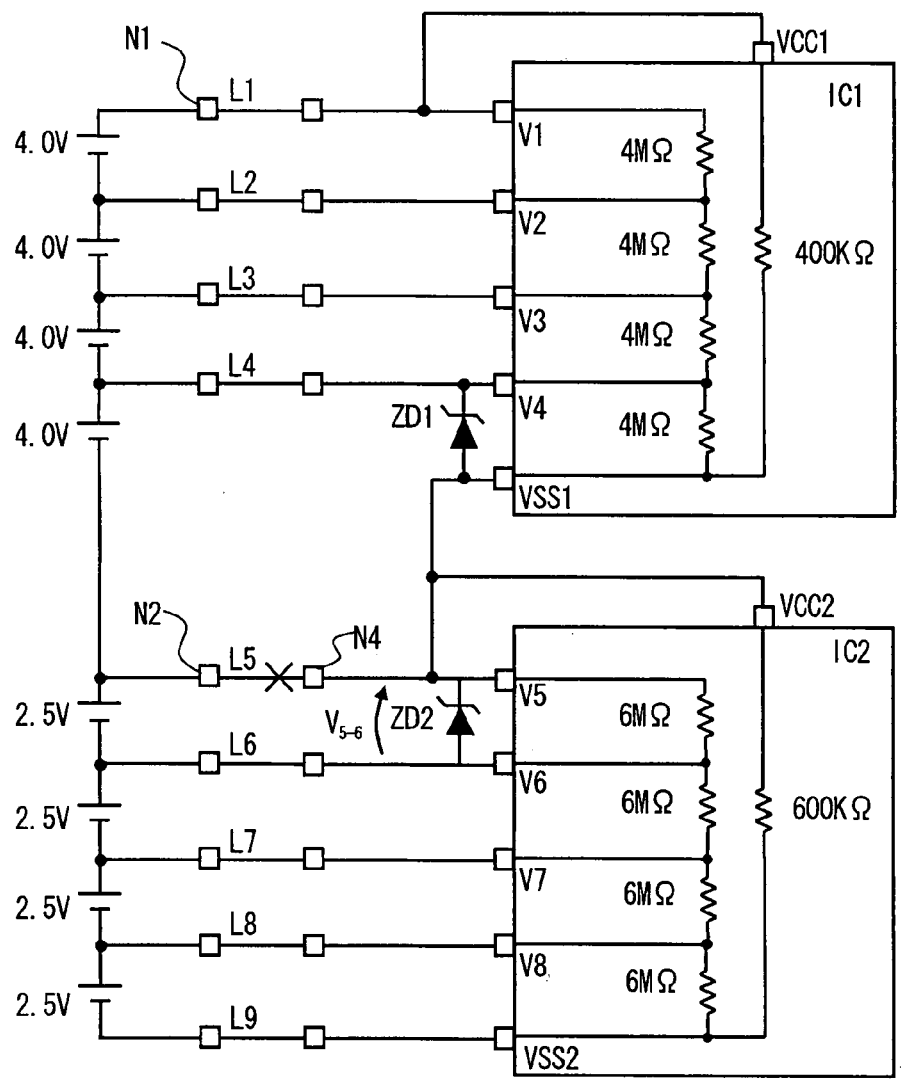
FIG. 6A is a view showing a specific example of the voltage monitoring apparatus according to the first embodiment of the present invention.
FIG. 6B is a view showing a voltage relationship of the circuit shown in FIG. 6A.

FIG. 6A is a view showing an opposite case to FIG. 5A, having a configuration of R1=R2=R3=R4=4 MΩ and R9=400KΩ of IC1, and R5=R6=R7=R8=6 MΩ and R10=600KΩ of IC2. Further, the battery cells are to output voltages of VC1=VC2=VC3=VC4=4V and VC5=VC6=VC7=VC8=2.5V. In this case, a disconnection of the line L5 causes to increase the potential of the node N4. Thus the voltage between the input terminals V5 and V6 increases, in an opposite manner to the above case. In such case, by the voltage monitoring apparatus of this embodiment, connecting the Zener diode of 5V between V5 and V6 by the breakdown voltage, the voltage between V5 and V6 can be clamped to 5V, and the voltage between V4 and VSS1 can be clamped up to 1.5V (FIG. 6B).

Figure 7:
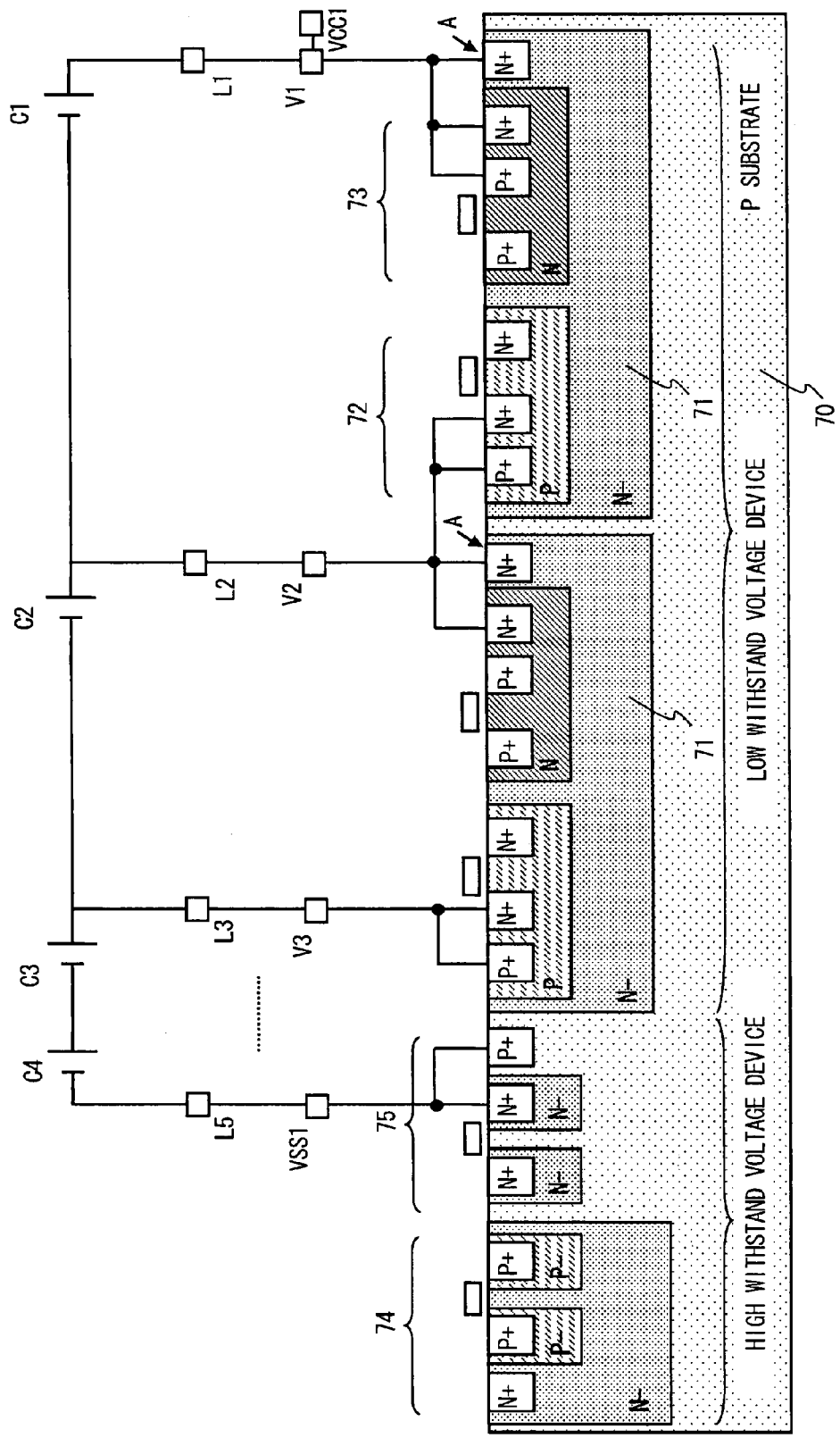
FIG. 7 is a schematic view showing a case where the voltage monitoring apparatus of the present invention formed over a semiconductor apparatus.

This embodiment is especially effective to a case where voltage sensor modules are formed by semiconductor apparatus or the like. As described herein, the reference voltage generation circuit 22 is configured by a circuit using the voltage of the battery cell (for example the potential difference between the input terminals V5 and V6) as the power supply voltage. The overvoltage detection comparator 23 and the low-voltage detection comparator 24 are configured by circuits using the potential difference between the power supply voltages (VCC and VSS) of the ICs as the power supply voltage. FIG. 7 is a schematic diagram showing a case where such circuits are formed in a semiconductor substrate. FIG. 7 is a schematic diagram showing a case where the reference voltage generation circuit 22, and the comparators 23 and 24 are formed in a P type semiconductor substrate 70. The reference voltage generation circuit 22 is formed using devices having low withstand voltage for saving space or the like because the reference voltage generation circuit 22 needs to operate according to the voltages between the terminals. In such a case, an N-well 71 is formed in the P type substrate 70. A voltage to be a high power supply potential of the reference voltage generation circuit 22 is supplied to the N-well 71 (see point A in FIG. 7). An NMOS transistor 72 and a PMOS transistor 73 required to form the reference voltage generation circuit 22 are formed in the N-well 71.

On the other hand, high withstand voltage devices to form the comparators 22 and 23 are formed in the P type substrate 70. As shown in FIG. 7, a PMOS transistor 74 and an NMOS transistor 75 to form the comparators are formed over the P type substrate that is applied with a ground potential VSS of IC. If a voltage more than the rated value is applied to the N well 71 in which low withstand voltage devices are formed, the NMOS transistor 72 and the PMOS transistor 73 connected between the terminals of the well 71, V1 and V2, are destroyed and not able to operate normally as ICs. In this embodiment, by the Zener diode, the voltage more than the rated value will not be supplied between the terminals, thereby preventing to destroy low voltage device.

As described herein, the voltage clamp device is connected to a terminal connecting the voltage sensor modules in the voltage monitoring apparatus in this embodiment. By connecting the Zener diode between a terminal connected to the power supply terminal of the voltage sensor module and other terminal, it is possible to prevent from applying a voltage more than withstand voltage to between terminals of the voltage sensor modules formed by semiconductor apparatus, for example, thereby providing the voltage monitoring apparatus with more stabled operations. A first and a second module terminals in the claims correspond respectively to the terminals VSS1 and V4, or V5 and V6 in this embodiment. A third module terminal corresponds to V5 and VSS1. Accordingly a first terminal in the claims corresponds to the terminal of the node N4 connected to the VSS1 and V5. A second terminal in the claims corresponds to the terminal of the node N5 or N6 in FIG. 1. As described herein, the voltage between the first terminal (N4) and the second terminal (N5 or N6) is clamped in this embodiment.

Second Embodiment

Figure 8:
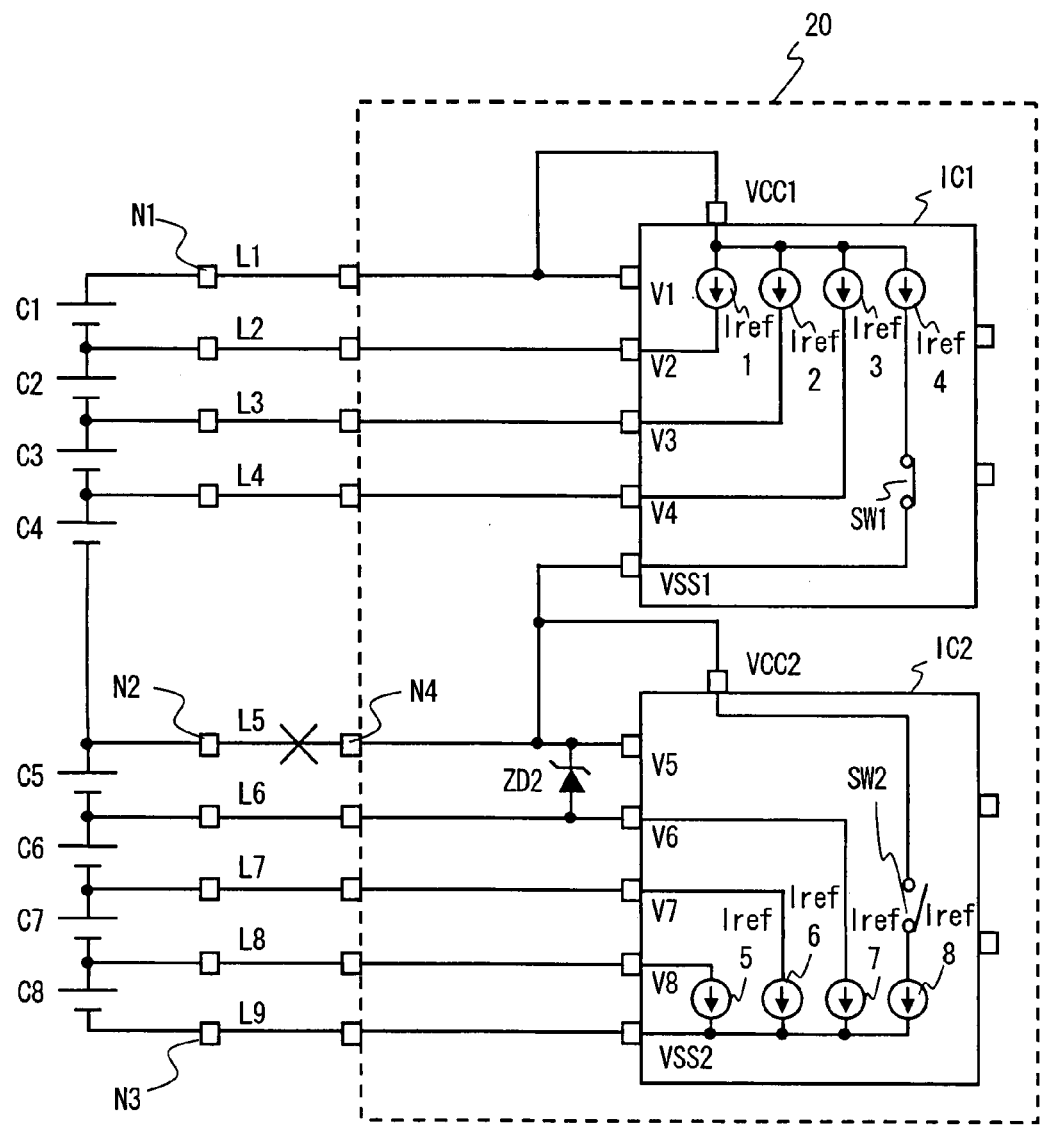
FIG. 8 is a view showing a voltage monitoring apparatus according to a second embodiment of the present invention.
Figure 9:
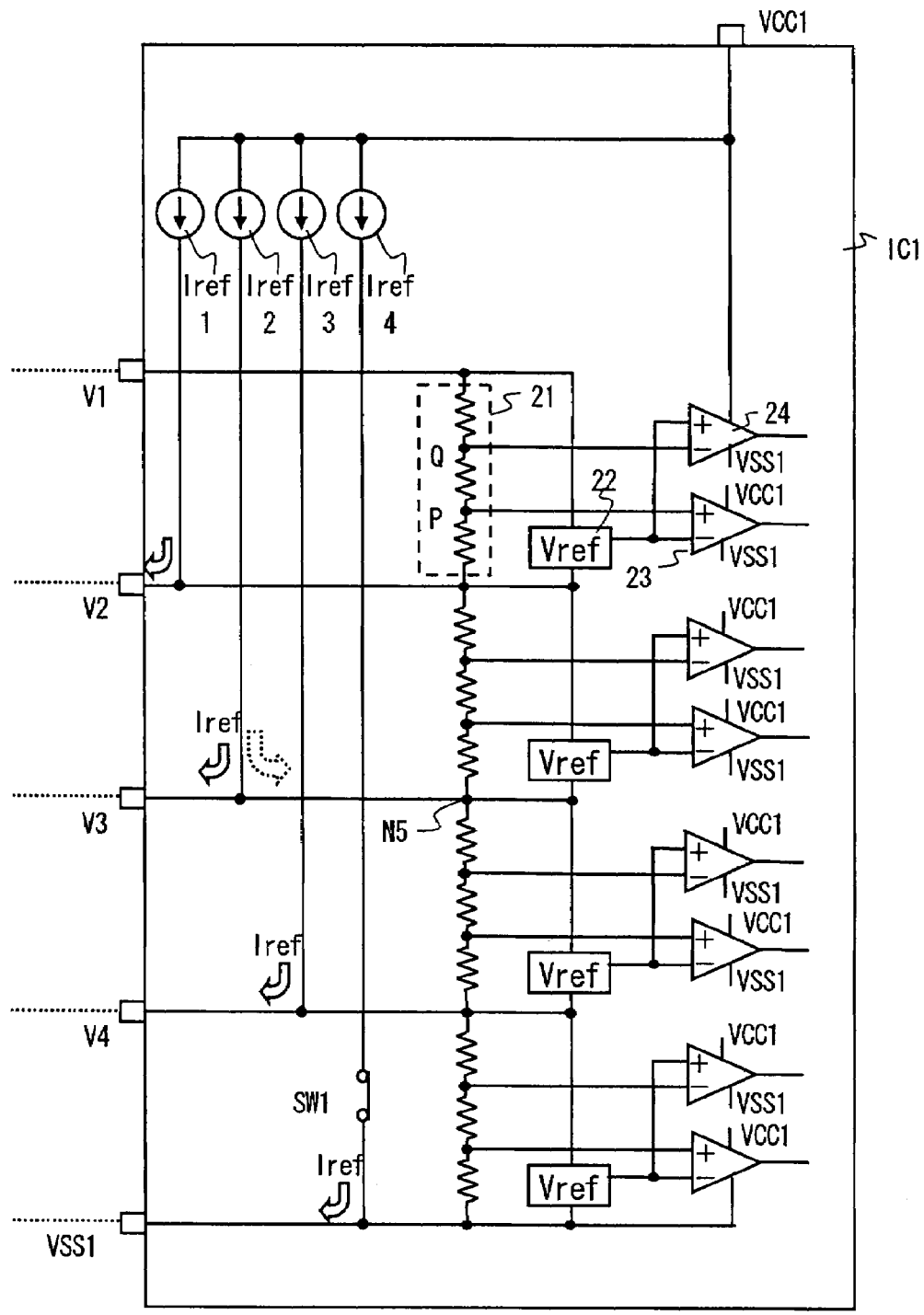
FIG. 9 is a view showing a voltage sensor module according to the second embodiment of the present invention.

FIG. 8 is a schematic diagram showing a configuration of a voltage monitoring apparatus 20 according to a second embodiment of the present invention. FIG. 9 is a view showing a configuration of a voltage sensor module according to the second embodiment. In the second embodiment, the present invention is used to the voltage sensor modules IC1 and IC2 having a function to detect a disconnection in the line connecting the battery cells and the input terminals. In this embodiment, the Zener diode ZD1 of the first embodiment is not provided but the Zener diode ZD2 is provided only between the input terminals V5 and V6.

The inventors describe an IC with a function to detect a disconnection using the technique disclosed in Japanese Patent Application No. 2005-98596 (U.S. application Ser. No. 11/387,926). Firstly the IC having the disconnection detection function disclosed in Japanese Patent Application No. 2005-98596 is briefly described hereinafter. Components identical to the drawings are denoted by reference numerals with repeating explanations omitted.

As shown in FIG. 9, the voltage sensor modules of the second embodiment include constant current sources Iref1 to Iref4 corresponding to the number of battery cells to be measured. In the voltage sensor modules (IC1) of FIG. 9, a current source Iref flows from the power supply terminal VCC1 to the input terminal V2 connected to the negative electrode of the battery cell C1 in IC1. The constant current source Iref2 passes the current source Iref from the power supply terminal VCC1 to the input terminal V3 connected to the negative electrode of the battery cell C2 in IC1. Similarly other constant current sources are sequentially connected. The constant current source Iref4 passes the constant current Iref from the first power supply terminal VCC1 to the second power supply terminal VSS1. As with IC1, constant current sources Iref5 to Iref8 are formed in IC2. However the constant current sources of IC2 are connected so that a current flows from the input terminals V6 to V8 to the second power supply terminal VSS2 (see FIG. 8).

A switch SW1 (SW2) is provided to a current path flowing a current from the first power supply terminal VCC1 (VCC2) of IC1 and IC2 to the second power supply terminal VSS1 (VSS2). This enables to selectively pass a current by a constant current source Iref4 (Iref8). As shown in FIG. 8 in this embodiment, the switch SW1 of IC1 is conductive while the switch SW2 of IC2 is nonconductive.

Taking an example with IC1, the current Iref generated by the constant current sources flows to the positive electrodes of the battery cells via the input terminals V2 to V4, VSS1, and lines L2 to L5 (see arrows in FIG. 9). Specifically in this embodiment, without a disconnection in the lines L1 to L8, the current Iref always generated by the constant current sources flows to each of the input terminals.

If the line L3 is disconnected here, a current flowing from VCC1 to V3 by the constant current source Iref2 does not flow to the input terminal V3 but flows to the voltage sensor (see the dotted arrow in FIG. 9). Consequently with an increased voltage of the node between voltage sensors (see N5 of FIG. 9), the voltage sensor detects a value not detected in a normal operation. This enables to detect a disconnection in the lines connecting the battery cells and the voltage monitoring apparatus.

A case in which the line L5 voltage is disconnected in the voltage monitoring apparatus 20 having such voltage sensor module is described herein after in detail. As described in the foregoing, the constant current source Iref4 is provided between VCC1 and VSS1 of IC1, and SW1 is conductive. Accordingly if the line L5 is not disconnected, the current Iref generated by Iref4 flows to the negative electrode side of the battery cell C4 via the power supply terminal VSS1 and L5. On the other hand if the line L5 is disconnected, the current generated by Iref4 flows towards the input terminal V5 of IC2. Thus the potential of the input terminal V5 increases, and the voltage between the input terminals V5 and V6 increases. Specifically in the voltage monitoring apparatus 20 configured as in FIG. 8, if the line L5 connected to the power supply of the voltage sensor modules is disconnected, the voltage of the input terminal V5 always increases. The clamping operation by the Zener diode ZD2 in case the voltage of the input terminal V5 increases is identical to the operation in the first embodiment. Thus the explanation will not be repeated here.

Accordingly in the voltage monitoring apparatus having the voltage sensor modules as in FIG. 9, by connecting the voltage clamp device (ZD2) only between a terminal connecting to a first power supply terminal (V5, VCC2) of the voltage sensor module (IC2) and other terminal (V6), it is possible to prevent from destroying IC caused by a voltage more than the rated voltage being applied.

Third Embodiment

Figure 10:
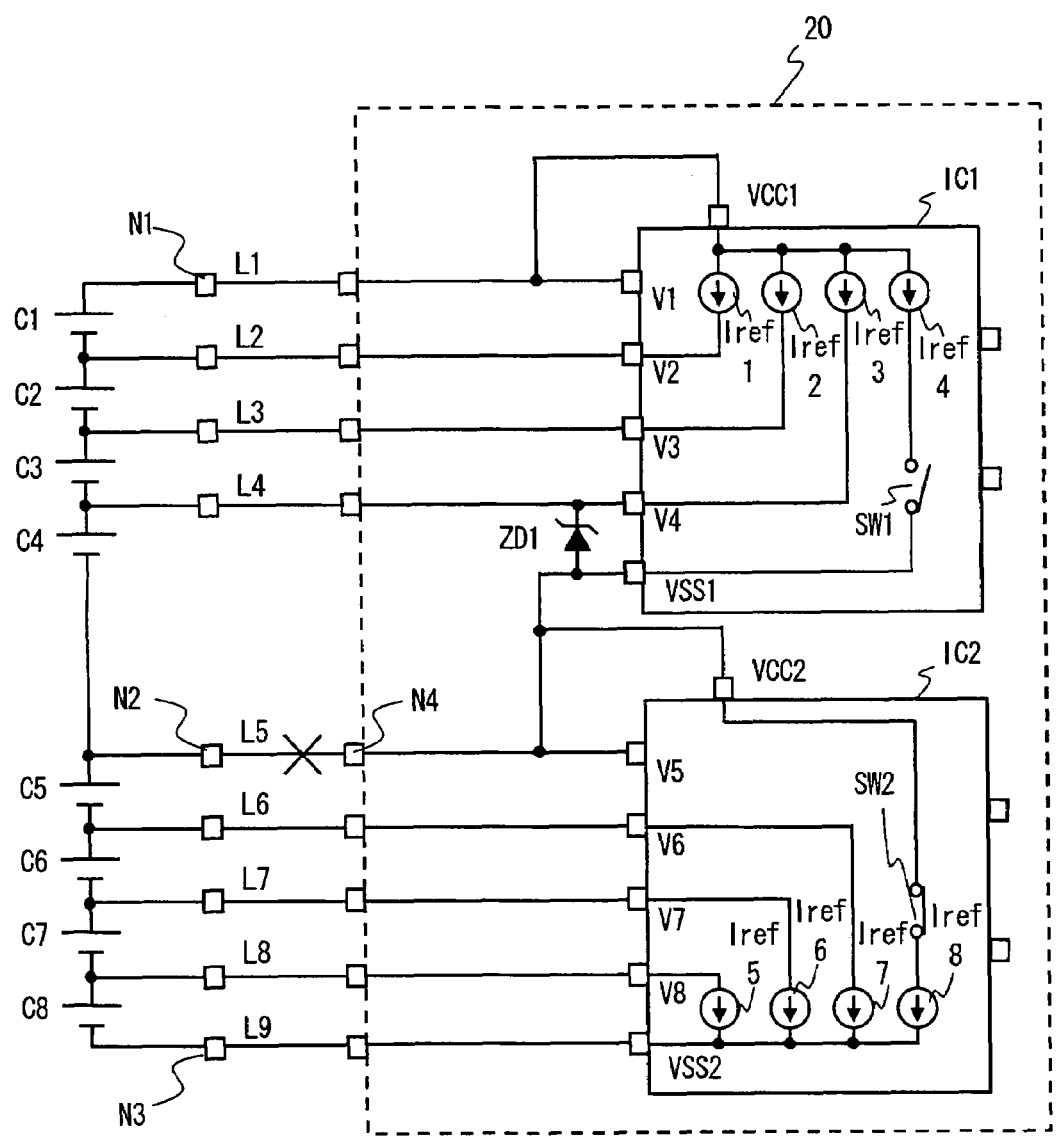
FIG. 10 is a view showing a voltage monitoring apparatus according to a third embodiment of the present invention.

FIG. 10 is a schematic diagram showing a voltage monitoring apparatus according to a third embodiment of the present invention. This embodiment has SW1 and SW2 with inverted conductive and nonconductive conditions of the second embodiment. Without a disconnection in the line L5, the current source Iref8 of IC2 generates a current flows from the positive electrode of the battery cell 5 to VSS2. With the disconnection in the line L5, the potential of the node N4 decreases because the constant current source 8 continues to pass the constant current. Accordingly by inverting conductive conditions of SW1 and SW2 of the second embodiment, if the line L5 is disconnected, the potential of the node N4 decreases. Therefore, in the third embodiment, the Zener diode ZD1 is connected only between the input terminal V4 and the power supply terminal VSS1 of IC1. The clamping operation of the voltage between V4 and VSS1 by the Zener diode ZD1 is identical to the first embodiment. Thus the explanation will not be repeated here.

Fourth Embodiment

Figure 11:
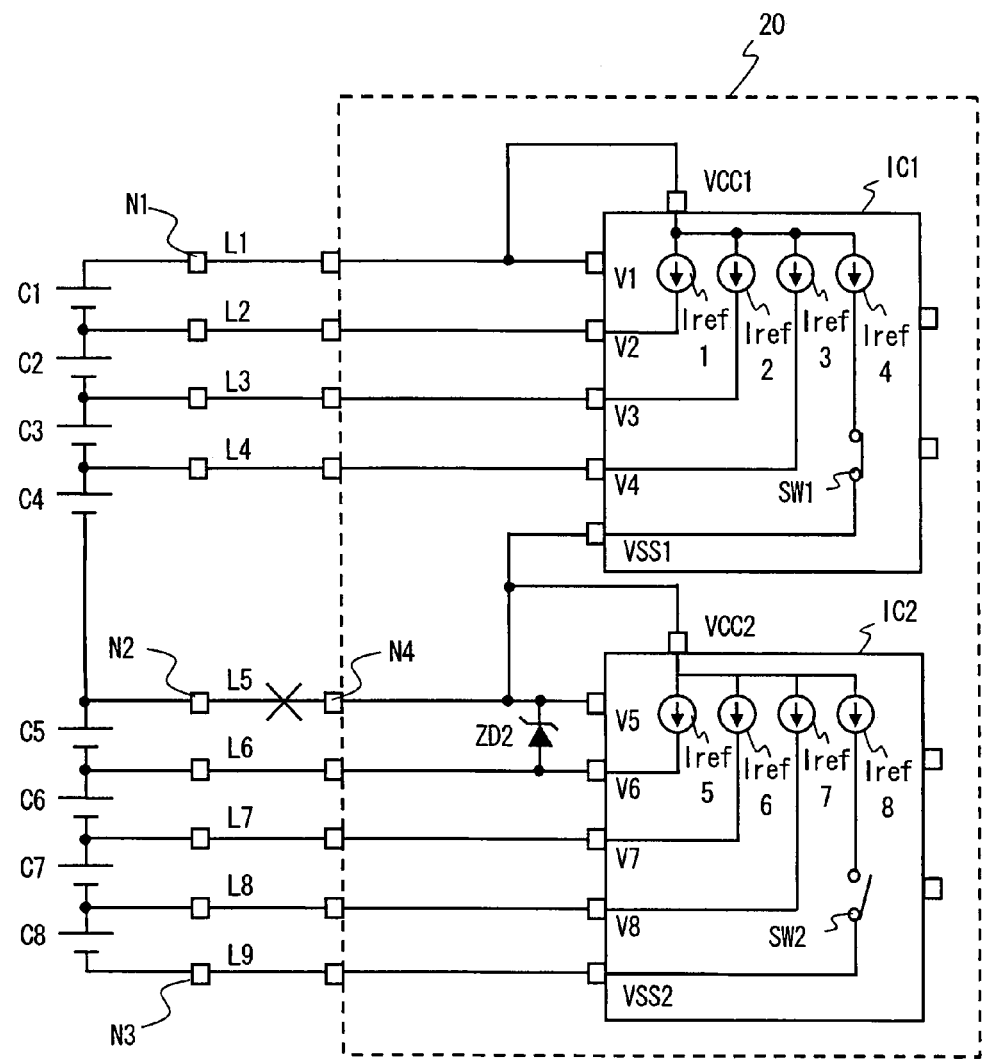
FIG. 11 is a view showing a voltage monitoring apparatus according to a fourth embodiment of the present invention.

FIG. 11 is a schematic view showing a voltage monitoring apparatus according to a fourth embodiment of the present invention. In the second embodiment, the constant current sources in the voltage sensor modules have different connections between IC1 and IC2. However in this embodiment, the same type of the voltage sensor modules are used with differences in current values of the current passed by the constant current sources to operate in the same way as the second embodiment.

In the voltage monitoring apparatus shown in FIG. 11, the voltage sensor modules described using FIG. 9 are connected as IC1 and IC2. As with the second embodiment, the switch SW1 is provided to the current path passing a current from the power supply VCC1 to VSS1 of IC and becomes conductive in IC1. Although IC2 is the voltage sensor module of the same type of IC1, the switch SW2 in the current path passing a current from VCC2 to VSS2 is nonconductive.

In this embodiment, the relationship can be expressed by the following formula, assuming the current values passed by the current sources Iref4 to Iref7 to be IREF4 to IREF7.

$$IREF4 = IREF5 + IREF6 + IREF7 + \alpha$$

Specifically, if the line L5 is disconnected, IREF5 to IREF7 flows from VCC2 to the input terminals V6 to V8 of IC2 by the constant current sources. However by setting IREF4 to the value above, the voltage of the terminal V5 increases because a current of $\alpha$ flows to V5.

In the second embodiment, the constant current sources Iref5 to 7 are connected between input terminals and VSS2 so that the voltage of the input terminal V5 increases if the line L5 is disconnected. However in this embodiment, if the line L5 is disconnected, the voltage of the terminal V5 is increased by the settings of the current values passed by the current sources. With such configuration, in case each of the voltage sensor modules are configured by apparatuses of same type, by setting the constant current source to the total value of other constant current sources+$\alpha$, where the current constant source is connected between the power supplies (VCC and VSS) of the voltage sensor modules, different types of voltage sensor modules are note required as in the second embodiment. However with the voltage sensor modules of the same type prepared, similar effects can be obtained by switching on and off.

Furthermore, it is possible to have a configuration in which the voltage of the terminal V5 decrease if the line L5 is disconnected, by switching the conductive conditions of IC1 and IC2 in the circuit shown in FIG. 11.

Fifth Embodiment

Figure 12:
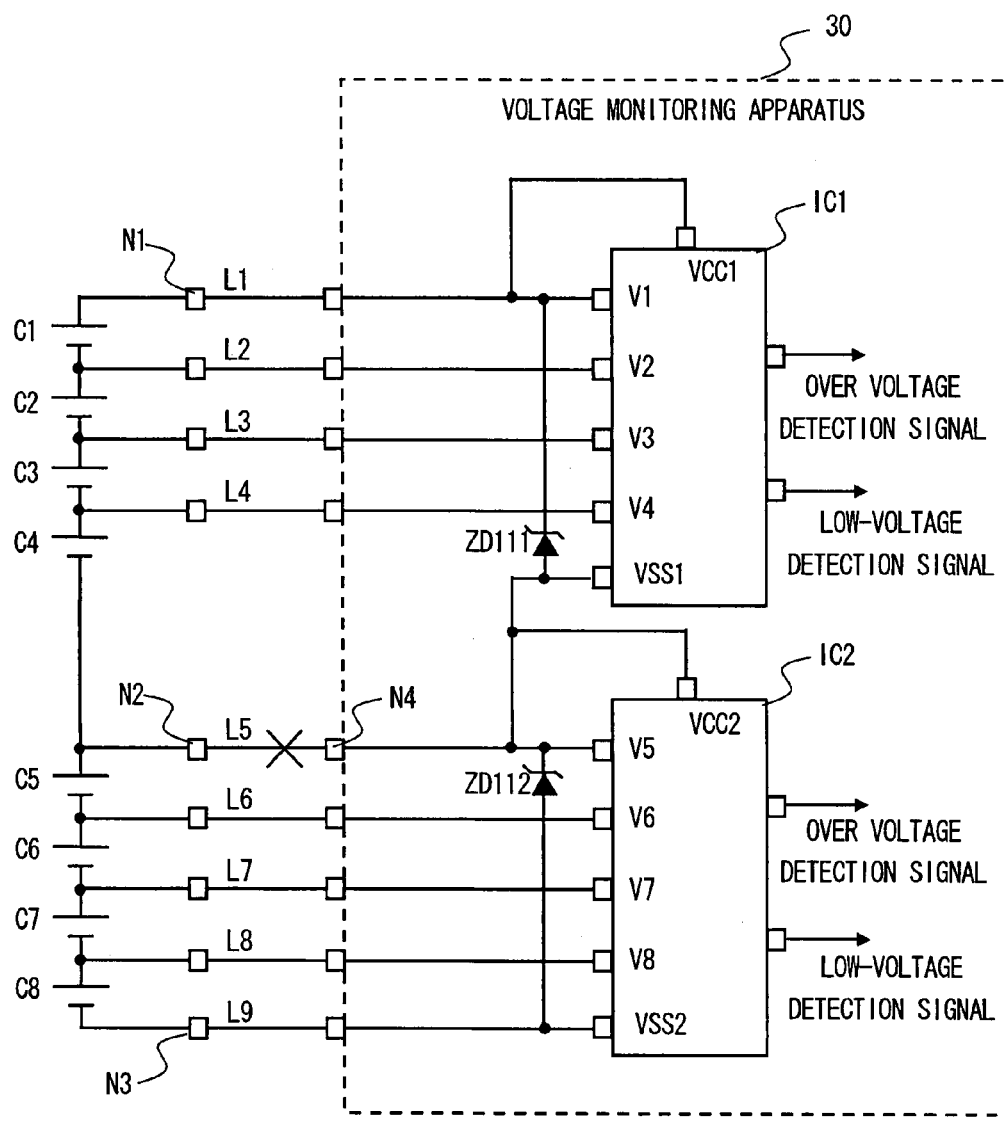
FIG. 12 is a view showing a voltage monitoring apparatus according to a fifth embodiment of the present invention.
Figure 13:
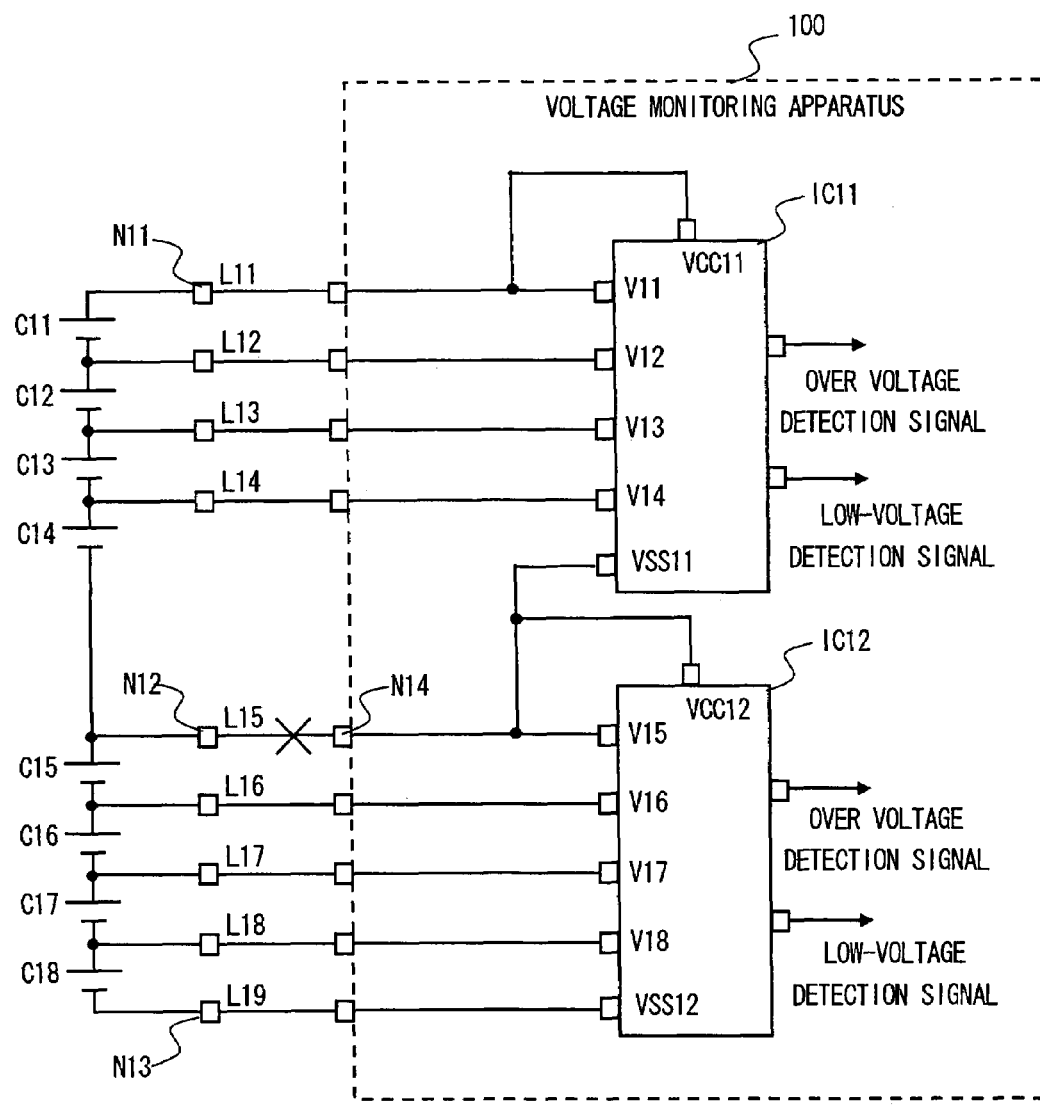
FIG. 13 is a circuit view showing a voltage monitoring apparatus according to a conventional technique.

FIG. 12 is a schematic diagram showing a voltage monitoring apparatus 30 according to a fifth embodiment of the present invention. In this embodiment, the Zener diode, which is a voltage clamp device, is connected between the first and the second power supply terminals of the voltage sensor module. Specifically, a Zener diode ZD111 is connected between the terminals VCC1 and VSS1 of IC1. A Zener diode ZD112 is connected between the terminals VCC2 and VSS2. By connecting in this way, even when the line L5 is disconnected, it is possible to prevent the potential of the node N4 increases or decreases, resulting the voltage supplied as the power supply of IC1 and IC2 to be more than the rated value. In this case, the breakdown voltage of the Zener diode is determined according to the power supply voltage that ICs operates therewith. In this embodiment, a first and a second terminals in the claims may be considered as the node N1 (terminal VCC1) and N4 (the terminals VSS1 and V5) or the node N4 and node N3 (terminal VSS2).

Although the embodiments of the present invention are described in detail, the present invention is not limited to the above embodiment but various changes may be made. Further, the fifth embodiment may be incorporated with the fifth embodiment, for example.

It is apparent that the present invention is not limited to the above embodiment and it may be modified and changed without departing from the scope and spirit of the invention.

What is claimed is:

1. A battery voltage monitoring apparatus to monitor a voltage of an assembled battery having a plurality of battery cells, the battery voltage monitoring apparatus comprising:
 a first voltage sensor module having a first voltage sensor,
  a first and a second module terminals connected to the first voltage sensor;

a second voltage sensor module having a second voltage sensor different from the first voltage sensor included in the first voltage sensor module and a third module terminal connected to the second voltage sensor;

a first terminal connected to the first and the third module terminals;

a second terminal connected to the second module terminal; and a voltage clamp circuit to clamp a voltage between the first and the second terminals disposed between the first and the second terminals.

2. The battery monitoring apparatus according to claim 1, wherein the voltage clamp circuit is a Zener diode.

3. The battery voltage monitoring apparatus according to claim 1, wherein the first module terminal is connected to a high potential power supply terminal of the first voltage sensor module, and the third module terminal is a low potential power supply terminal of the second voltage sensor module.

4. The battery voltage monitoring apparatus according to claim 2, wherein the first module terminal is connected to the high potential power supply terminal of the first voltage sensor module, and the third module terminal is a low potential power supply terminal of the second voltage sensor module.

5. The battery voltage monitoring apparatus according to claim 1, wherein the first module terminal is a low potential power supply terminal of the first voltage sensor module, and the third module terminal is connected to a high potential power supply terminal of the second voltage sensor module.

6. The battery voltage monitoring apparatus according to claim 2, wherein the first module terminal is a low potential power supply terminal of the first voltage sensor module, and the third module terminal is connected to a high potential power supply terminal of the second voltage sensor module.

7. The battery voltage monitoring apparatus according to claim 1, wherein the second terminal is supplied with a potential, the potential being different from the first terminal by one phase of the battery cell.

8. The battery voltage monitoring apparatus according to claim 1, wherein the first terminal is connected to a low potential power supply terminal of the first voltage sensor module, and the second module terminal is a low potential power supply terminal of the second voltage sensor module.

9. The battery voltage monitoring apparatus according to claim 2, wherein the first terminal is connected to a low power supply terminal of the first voltage sensor module, and the second terminal is connected to a high potential power supply terminal of the first voltage sensor module.

10. The battery voltage monitoring apparatus according to claim 1, wherein the first module terminal is connected to the high potential power supply terminal of the first voltage sensor module, and the second module terminal is a low potential power supply terminal of the first voltage sensor module.

11. The battery voltage monitoring apparatus according to claim 2, wherein the first module terminal is connected to the high potential power supply terminal of the first voltage sensor module, and the second module terminal is a low potential power supply terminal of the first voltage sensor module.

12. The battery voltage monitoring apparatus according to claim 1, wherein at least one of the first and second voltage sensor modules comprising:

a plurality of input terminals; and a current source connected to the plurality of input terminals.

13. The battery voltage monitoring apparatus according to claim 8, wherein at least one of the first and second voltage sensor modules comprising:

a current source to pass a current from a high potential power supply terminal to a low potential power supply terminal of the voltage sensor module; and a switch to control a conductive condition of a current from the current source.

* * * * *